Patented Jan. 9, 1945

2,366,738

UNITED STATES PATENT OFFICE 2,366,738

ORGANIC ACIDS MODIFIED BY FORMALDEHYDE AND GLYCOL

Donald John Loder and William Franklin Gresham, Wilmington, Del., assignors to E. I. du Pont de Nemours & Company, Wilmington, Del., a corporation of Delaware No Drawing. Application December 20, 1941, Serial No. 423,804

9 Claims. (Cl. 260—410.6)

This invention relates to a process for the preparation of oxygenated organic compounds and more particularly to the modification of organic acids and their derivatives by reacting the acid or a derivative thereof with a glycol and an aldehyde. The invention likewise relates to the compounds thus obtained.

An object of the present invention is to provide new reaction products from the interaction of an organic acid ester or anhydride with a vicinal glycol (i. e. a glycol having hydroxyl groups on adjacent carbon atoms), and an aldehyde, or with a vicinal glycol and an acetal. Another object of the invention is to provide new compositions of matter obtainable in accord with the process of the first object. Yet another object is to provide a process for the interaction of ethylene glycol and formaldehyde or ethylene glycol and a formal with mono or polycarboxylic acids or their derivatives. A further object of the invention is to so modify water-insoluble high molecular weight acids and esters which contain 8 carbon atoms or more that they become water soluble. Another object is to provide reaction conditions and catalysts for such reactions whereby valuable products are obtainable. Other objects and advantages of the invention will hereinafter appear.

The modified organic acids, esters, and their anhydrides are obtained in accord with the invention by reacting a vicinal glycol and an aldehyde, or a vicinal glycol and an acetal with carboxyl-containing compounds such, for example, as:

(1) Monocarboxylic aromatic and aliphatic organic acids, (2) Polycarboxylic aromatic and aliphatic organic acids, (3) Mono and polyhydroxyaliphatic and aromatic carboxylic acids, (4) Substituted carboxylic acids containing at least one carboxyl group, and (5) Esters and dehydration products of the above acids.

In accord with the present invention, valuable products are obtained by reacting a monocarboxylic acid or derivative thereof with ethylene glycol and formaldehyde which products may have the generic formula RCO(OCH2OCH2CH2)$_x$OH and/or RCO(OCH2CH2OCH2)$_x$OH in which $x$ is an integer and R is an alkyl, substituted alkyl, aryl, or substituted aryl group, such, for example, as methyl, ethyl, propyl, butyl amyl, and the higher alkyl groups, such as dodecyl, stearyl, cetyl, ceryl, etc.; phenyl, tolyl, salicyl, etc.; the alkoxy alkyls, such as methoxy methyl, methoxymethoxy methyl, ethoxy methyl, and so forth; hydroxy methylene, hydroxy ethylene, methyl hydroxy ethylene, etc.; and in fact any hydrocarbon or oxygenated hydrocarbon substitution in the R position. Similarly, from ethylene glycol, formaldehyde, and dicarboxylic acids valuable products are obtained which may be designated by the following formula:

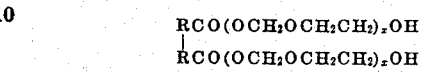

wherein $x$ is a positive integer and the R groups are similar to those designated above except that in this formula the R groups are divalent. Similarly, carboxylic acids containing more than two carboxyl groups in the molecule may be reacted to give corresponding products. If esters are reacted instead of acids an alkyl group will in many instances be substituted for the terminal hydrogen atoms in the above formula.

The above description is directed for simplicity to the reaction of a carboxylic acid and ethylene glycol with formaldehyde, but this invention includes, in addition, the reaction of such acids and vicinal glycols generally with aldehydes or with acetals. The vicinal glycols which may be employed, other than ethylene glycol, include, for example, 1,2-propylene glycol, 1,2-butylene glycol, 2,3-butylene glycol, and higher molecular weight vicinal glycols. The aldehydes, other than formaldehyde, which may be employed with the vicinal glycols include acetaldehyde, n- and iso-propanal, n- and iso-butanol, and the like.

In lieu of formaldehyde in the reaction, formals may be used such, for example, as methylal, and other symmetrical formals such as diethyl formal, di-, n-propyl and di-isopropyl formals, di-, n-, and di-isobutyl formals and the higher symmetrical alkyl formals; the unsymmetrical formals such as methyl ethyl formal, methyl propyl formal, ethyl propyl formal, methyl ethanol formal (CH3OCH2OCH2CH2OH) and the like; while the invention is primarily directed to the reaction of the organic acids or derivatives and vicinal glycol with formaldehyde and formals, acetals likewise may be employed such, for example, as dimethyl acetal, methyl ethyl acetal, diethyl acetal, and the substituted acetals commonly referred to as ketals, such as dimethyl ketal, diethyl ketal, and the like.

The vicinal glycol and formaldehyde or formal can be combined in accord with the invention with: (1) monocarboxylic aliphatic acids, such, for example, as: formic, acetic, propionic, n- and iso-butyric, n- and iso-valeric acid, trimethyl acetic and the higher acids of this class, such as, for example, capric, lauric, myristic, palmitic, stearic, melissic acids, etc.; the hydroxy substituted acids of this class such, for example, as: hydroxyacetic, hydroxypropionic, lactic acids and their dehydration products such as glycolid, glycolic anhydride, diglycolic anhydride, lactid, etc.; the alkoxy substituted acids of the class such, for example, as: methoxy-, ethoxy-, propoxy-, methoxymethoxy-, ethoxymethoxy-acetic, propionic and higher like substituted acids; and the unsaturated acids such, for example, as: acrylic, α-substituted acrylic (e. g., methacrylic), butenic, angelic, tiglic, oleic, ricinoleic, elaidic, erucic acids, etc.; (2) the monocarboxylic aromatic acids, such, for example, as: benzoic, phenylacetic, o-, m-, and p-toluic, hyrocinnamic, o-, m-, p-tolyl acetic, o-, m-, p-ethyl benzoic and mesitylenic acids; the substituted acids of the class, for example, as: salicylic, meta and para hydroxy-benzoic, mandelic, tropic, oxybenzoic, and anisic acids and the unsaturated acids such, for example, as: cinnamic, atropic, phenyl-propiolic, and coumaric acids; (3) the dicarboxylic aliphatic acids such, for example, as: oxalic, malonic, succinic, glutaric, adipic, pimelic, camphoric acids, etc.; the hyroxy substituted acids of the class such, for example, as: tartronic, malic, tartaric, racemic and other acids of this class such, for example, as: maleic, fumaric, trihydroxy-glutaric, saccharic, mucic, isosaccharic, mesoxalic, oxal-acetic, acetone dicarboxylic, dihydroxy-tartaric, and diaceto-succinic, tricarballylic, and citric acids; (4) the polycarboxylic aromatic acids such, for example, as: o-, m-, p-phthalic, hydrophthalic, 2,5 - dihydroxy - terephthalic, and mellitic acids; and (5) such acids as: cyanacetic, sulfanilic, tannic and thioacetic acids; the ketone acids; pyruvic, phthalonic, levulinic, the acyl substituted acids, acetoxyacetic, propionic, and butyric acids. The esters and polymers of the invention may also be made from the esters and dehydration products of the above acids, such as the anhydrides, polyacids, etc. Saturated and unsaturated fatty acid oils and the vicinal glycol may likewise be reacted with formaldehyde, or formal, and, by way of example, there are included: cotton seed, rape, sesame, beechnut, linseed, poppy, sun flower, palm nut, coconut, Tall, soybean, China-wood, corn, castor, and oiticica oils, as well as the triglycerides, tripalmitics, tristearics, etc. Esters and anhydrides of the above acids may also be used.

The reaction is effected at temperatures ranging between —80 and 300° C. and preferably between 0 and 150° C. Atmospheric, sub- or superatmospheric pressures may be used, and if the last pressures may range between 1 and 1000 atmospheres or higher. Normally excellent results are obtained at or about atmospheric pressure. If desired, the temperature of the reaction, especially when carried out at the boiling point of the reaction mixture, may be controlled by varying the pressure on the boiling reactant.

It has been found advantageous to effect the reaction in the presence of acidic type catalysts such, for example, as sulfuric acid, phosphoric acid, hydrochloric acid, hydrofluoric acid (alone or with $BF_3$), boron trifluoride (including its complexes with water, acids, esters, alcohols, and the like) paratoluenesulfonic acid, camphor sulfonic acid, and other acid catalysts of this general nature. Friedel-Crafts type catalysts other than $BF_3$ may be used, such as $AlCl_3$, $AlBr_3$, $FeCl_3$, and so forth as well as inorganic acids generally and their acid salts such as sodium acid sulfate, sodium acid phosphate and so forth.

The reaction is preferably conducted approximately to equilibrium in order to obtain the desired products. The reaction may then be stopped by destroying the catalyst. This may be done by removing it or by treating the reaction mixture with an inorganic base, such as ammonia, alkali metal, and alkaline earth metal hydroxides, carbonates, alkoxides, and so forth or an organic base, such as pyridine, dimethylamine, and the like. These bases are added in sufficient amounts to neutralize the catalyst when acid catalysts are used, and the unconverted reactants may be removed by distillation under reduced pressures. As soon as the catalyst has been neutralized, the reaction ceases. The neutralized catalyst may be filtered off and the polymerized product which remains treated for the recovery of the polymers.

Examples will now be given illustrating preferred embodiments of the invention but it will be understood that it is not to be limited by the details thereof. Parts are by weight unless otherwise indicated.

*Example 1.*—A reaction charge was prepared by mixing 242 parts of ethylene glycol, 10.7 parts of lauric acid, 126 parts of formaldehyde (as paraformaldehyde), 77.9 parts of cyclohexane, and 1.58 parts of sulfuric acid. The above reaction mixture was heated under a reflux column equipped with decanting head. The heterogeneous azeotrope containing cyclohexane, dioxolane, and water boiling at 61–62° C. collected in the separator. The lower layer (calculated 50% water and 50% dioxolane) was continuously withdrawn from the bottom of the receiver and the upper layer (dioxolane and cyclohexane) was returned to the reaction mixture. In this manner, complete removal of water produced in the reaction mixture was attained. Excess cyclohexane was distilled from the reaction mixture as its dioxolane azeotrope (B. P. 68° C. calculated 43% cyclohexane and 57% dioxolane). The reaction product, 123.7 parts of a light, straw-colored liquid, was cooled to room temperature and 1.36 parts of NaOH and 5 parts of water added to neutralize the sulfuric acid catalyst. Removal of unconverted dioxolane and water under reduced pressure (1 mm. at 120° C.) gave 101.5 parts of a modified lauric acid product. This material was soluble in water. Its aqueous solution exhibited very good foaming properties.

*Example 2.*—A reaction charge was prepared by mixing 10.7 parts lauric acid, 189 parts of formaldehyde (as paraformaldehyde) 372 parts ethylene glycol, 38.9 parts of cyclohexane, and 1.58 parts of sulfuric acid. The above mixture was processed under conditions simulating those employed in Example 1. The product comprised 217.2 parts of viscous, straw-colored liquid modified lauric acid which was water soluble. Its aqueous solution also exhibited foaming properties.

The modified organic derivative products of the invention are non-polar surface-acting agents and are generally applicable for use where agents of this nature are required. They are especially adapted for wetting, deterging, penetrating, and allied uses.

We claim:

1. A process of obtaining a modified lauric acid which comprises contacting lauric acid, ethylene glycol, and formaldehyde with sulfuric acid at a temperature between —80 and 300° C.

2. A process of obtaining a modified oleic acid which comprises contacting oleic acid, ethylene glycol, and formaldehyde with sulfuric acid at a temperature between —80 and 300° C.

3. A process of obtaining a modified hydroxyacetic acid, which comprises refluxing hydroxyacetic acid, ethylene glycol, and formaldehyde with an acidic catalyst, removing the water as formed, and subsequently recovering the modified hydroxyacetic acid.

4. A process of obtaining a water-soluble reaction product of lauric acid which comprises preparing a mixture containing 242 parts of ethylene glycol, 10.7 parts of lauric acid, 126 parts of formaldehyde, 77.9 parts of cyclohexane, and 1.58 parts of sulfuric acid; refluxing the mixture and subsequently subjecting it to distillation for the removal of cyclohexane, dioxolane, and water; separating dioxolane and cyclohexane from the upper layer of the resulting condensate; and returning it to the reaction mixture; continuing the distillation until substantially all the water produced in the reaction is removed; distilling the excess cyclohexane from the reaction mixture as its dioxolane azeotrope; treating the reaction product with 1.36 parts of sodium hydroxide and 5 parts of water; and subsequently recovering a modified lauric acid, water-soluble product.

5. A condensation product of a hydroxycarboxylic acid, ethylene glycol, and formaldehyde.

6. A condensation product of glycolic acid, ethylene glycol, and formaldehyde.

7. A process of obtaining an oxygenated organic compound containing an acyl group RCO and at least one dioxolane group

—OCH$_2$OCH$_2$CH$_2$— in which R is an alkyl group which comprises subjecting ethylene glycol, formaldehyde and a reactant selected from the group consisting of organic carboxylic acids, their esters and anhydrides to a reaction in the presence of an acid catalyst, refluxing the mixture and subjecting it to distillation for the removal of dioxolane and water, separating the dioxolane from the resulting condensate and returning it to the reaction mixture, continuing the distillation until substantially all the water produced as a result of the reaction is removed, and subsequently recovering the dioxolane modified compound of the group.

8. A process of obtaining a modified organic carboxylic acid having the structural formula RCO(OCH$_2$OCH$_2$CH$_2$)$_x$OH in which $x$ is an integer and R an alkyl group which comprises subjecting ethylene glycol, formaldehyde and an organic carboxylic acid to a reaction in the presence of an acid catalyst, refluxing the mixture and subjecting it to distillation for the removal of dioxolane and water, separating the dioxolane from the resulting condensate and returning it to the reaction mixture, continuing the distillation until substantially all the water produced as a result of the reaction is removed, and subsequently recovering a modified organic carboxylic acid, water-soluble product.

9. A condensation product of lauric acid, ethylene glycol and formaldehyde.

DONALD JOHN LODER.
WILLIAM FRANKLIN GRESHAM.